United States Patent [19]

Pentith

[11] 4,067,257
[45] Jan. 10, 1978

[54] ELECTRICAL CONDUIT

[75] Inventor: Gerald Richard Oldham Pentith, Barnsley, England

[73] Assignee: Pitcraft Limited, Barnsley, England

[21] Appl. No.: 574,948

[22] Filed: May 6, 1975

[30] Foreign Application Priority Data

May 21, 1974 United Kingdom .............. 22541/74
Aug. 6, 1974 United Kingdom .............. 34537/74

[51] Int. Cl.² ............................................. B60M 1/34
[52] U.S. Cl. ................................ 104/140; 104/147 R; 104/161; 191/25; 191/31
[58] Field of Search ........... 104/139, 140, 146, 147 R, 104/155, 156, 157, 158, 159, 161; 198/204, 171, 109, 735, 860, 861, 864; 191/25, 30, 31; 299/43

[56] References Cited

U.S. PATENT DOCUMENTS

| 405,628 | 6/1889 | Van Depoele | 191/25 |
| 560,678 | 5/1896 | Brandenburg | 191/25 |
| 1,048,668 | 12/1912 | Evans | 191/25 X |
| 3,455,432 | 7/1969 | Dawson | 299/43 |
| 3,458,235 | 7/1969 | Romer et al. | 198/109 X |
| 3,472,556 | 10/1969 | Bolton | 299/43 |
| 3,578,810 | 5/1971 | Newstead | 299/43 |
| 3,722,424 | 3/1973 | Van Veldhulzen | 104/161 X |
| 3,749,026 | 7/1973 | Carrasse | 104/156 |
| 3,768,418 | 10/1973 | Yoshida | 104/161 |
| 3,848,712 | 11/1974 | Flodell | 191/25 X |

Primary Examiner—Trygve M. Blix
Assistant Examiner—Randolph A. Reese
Attorney, Agent, or Firm—Lowe, King, Price & Markva

[57] ABSTRACT

An electrical power supply conduit comprises an elongate electrical conductor located in the conduit, the latter preferably being pressurized with clean air or an inert gas and having an entry slot extending longitudinally, through which slot, in use, an electrical pick up e.g. a pantograph of an electrical machine may enter the conduit to gain access to the electrical conductor, with a flexible mechanical seal extending longitudinally of the conduit and normally closing the slot.

18 Claims, 8 Drawing Figures

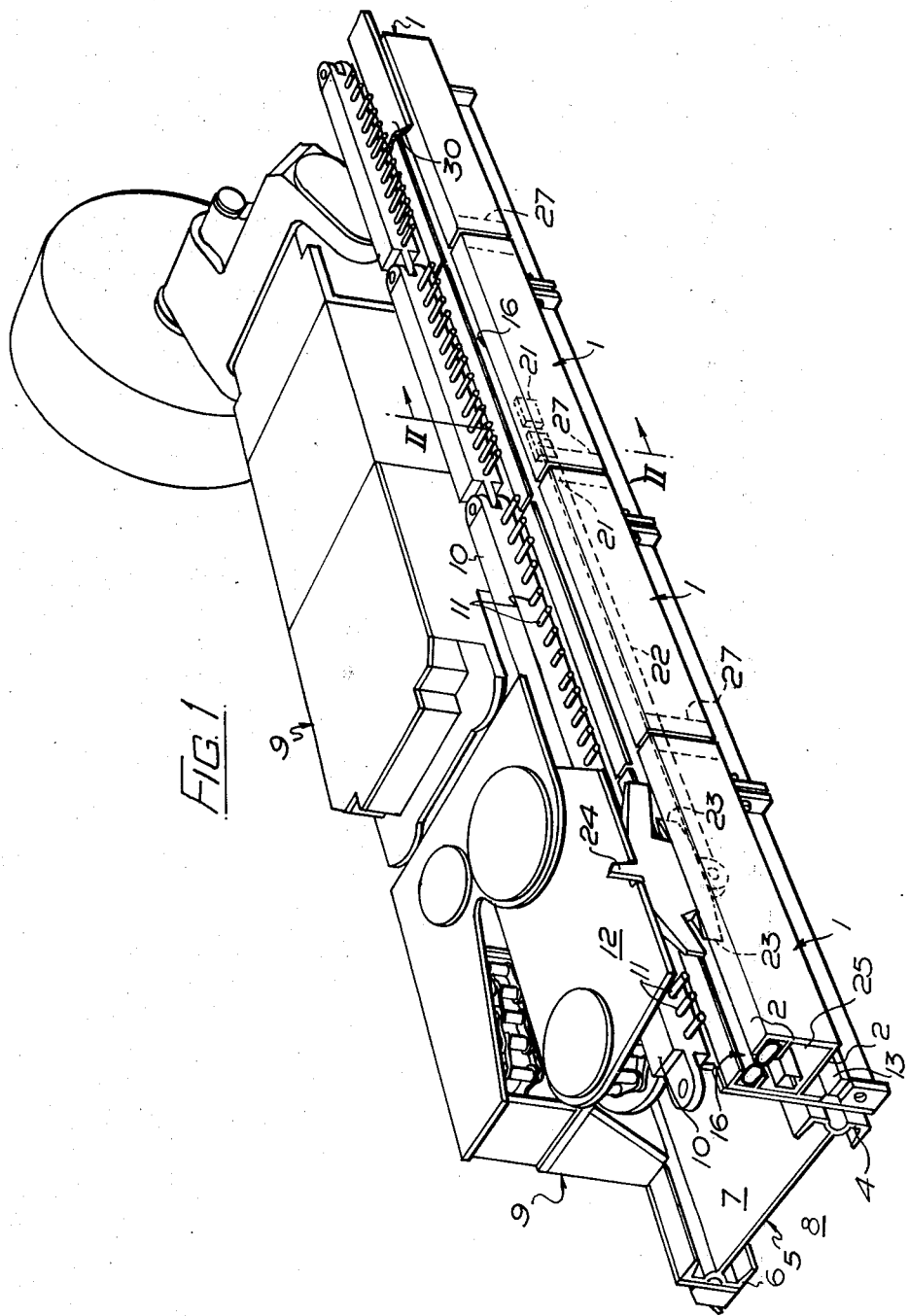

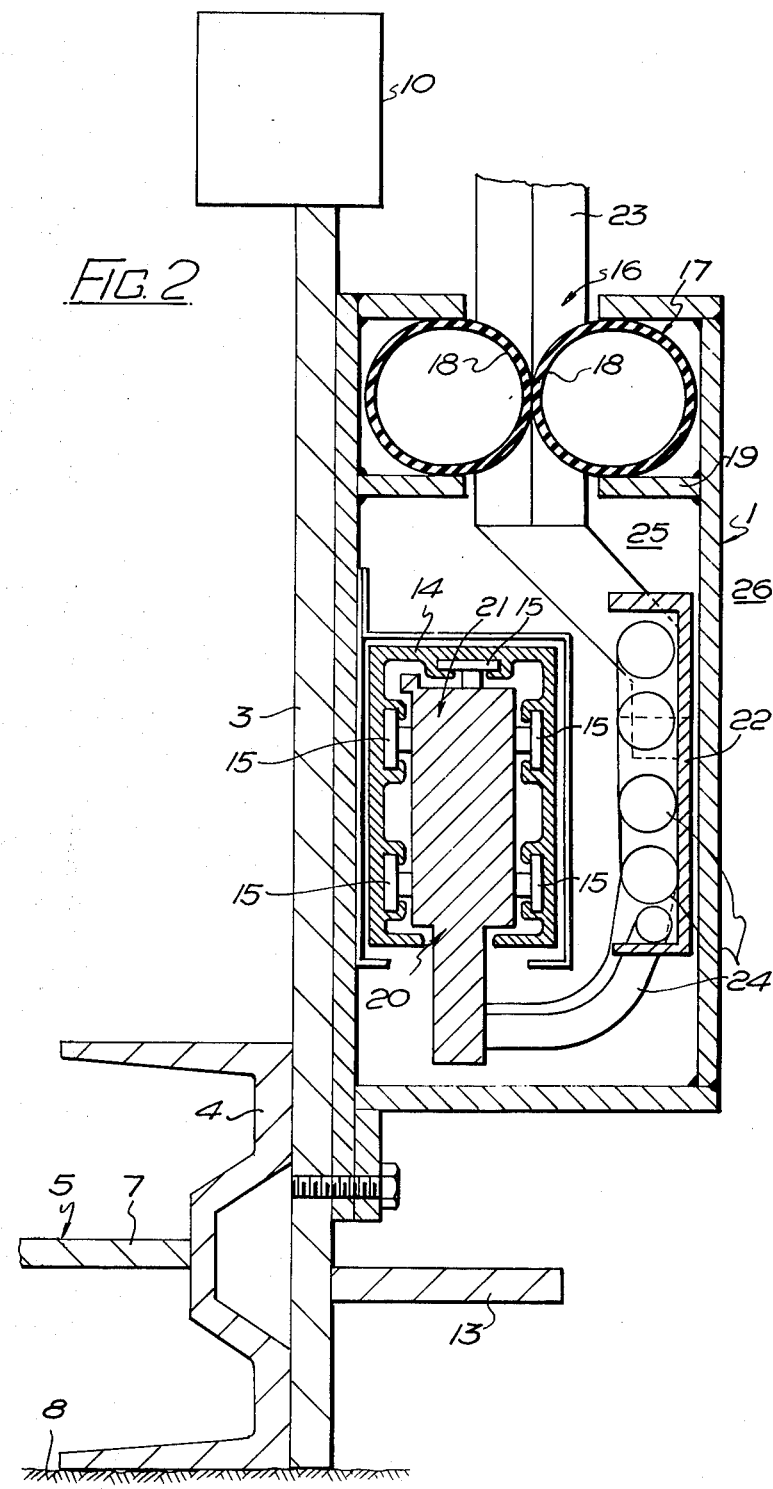

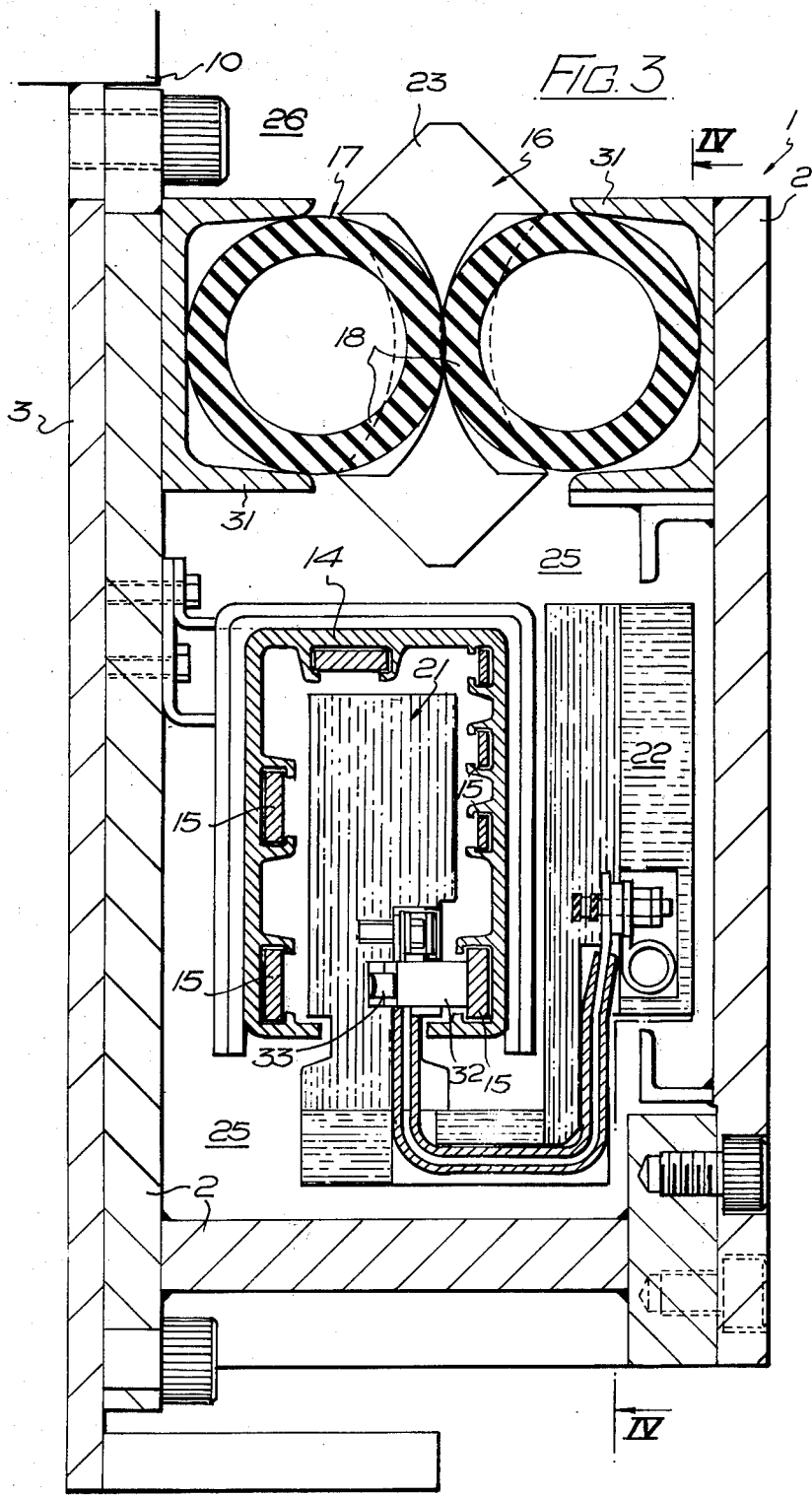

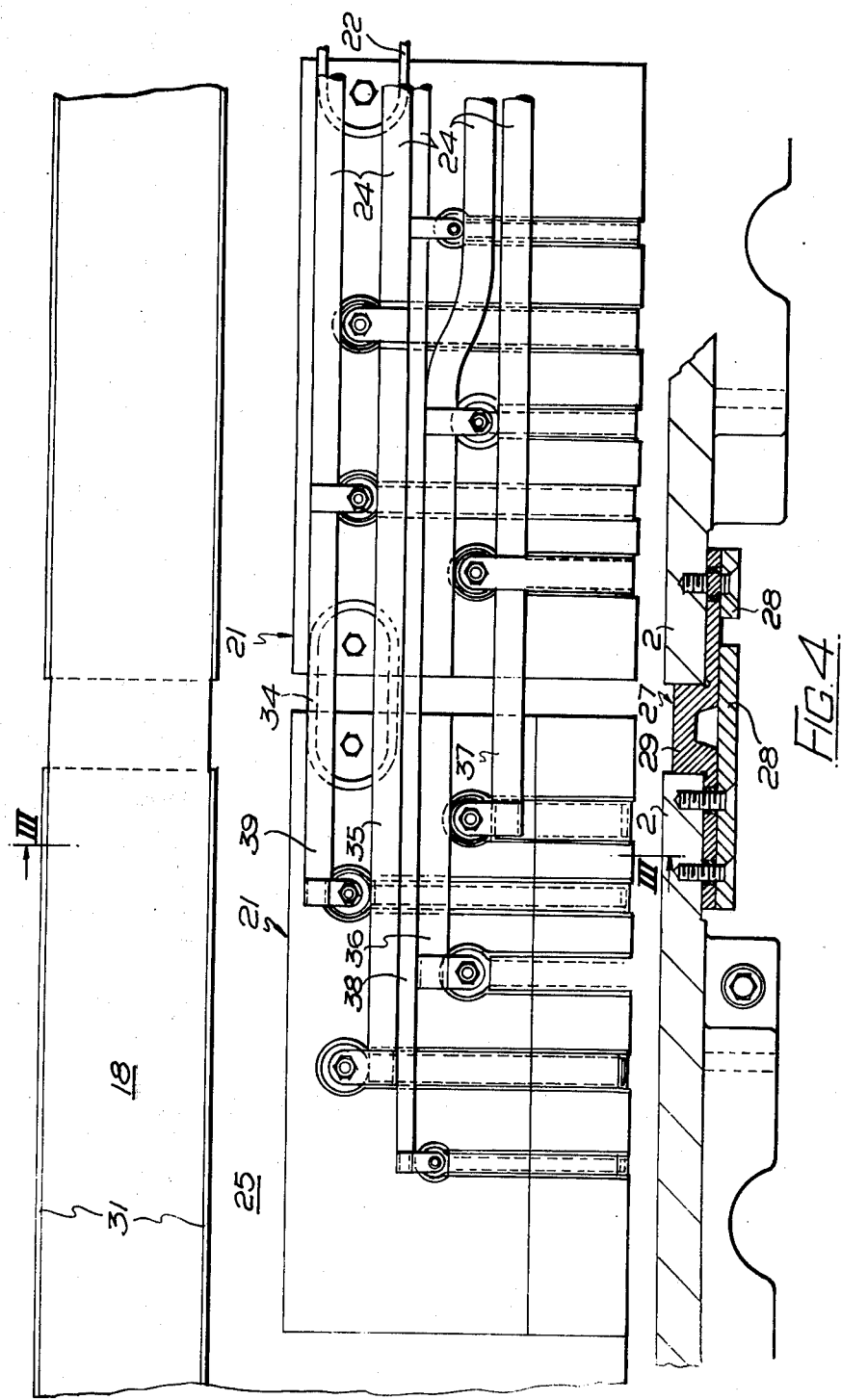

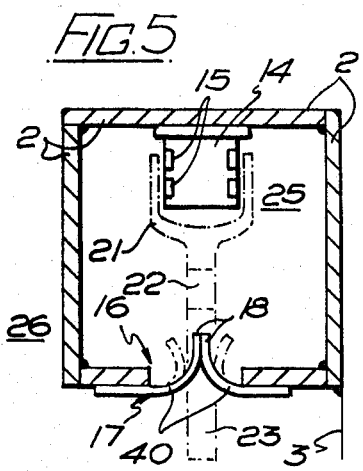
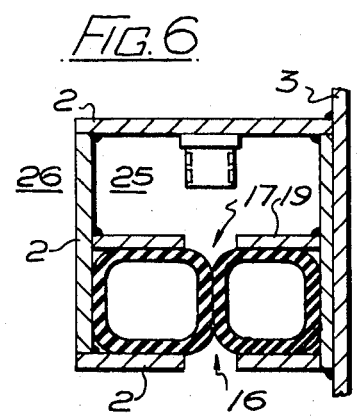
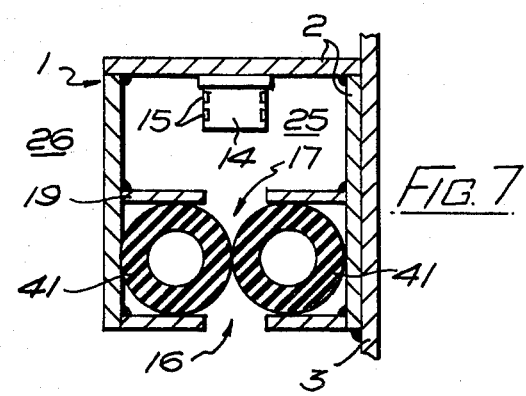
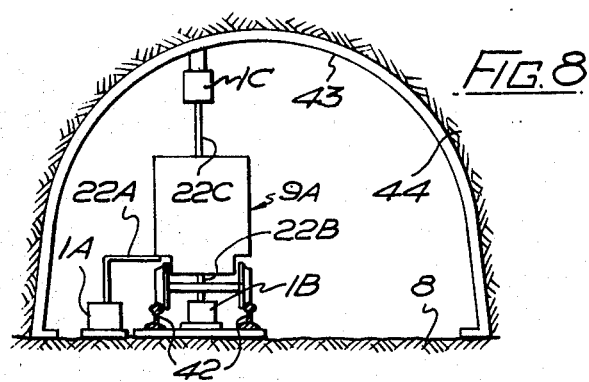

ELECTRICAL CONDUIT

This invention relates to electrical power conduits for particularly though not exclusively mine equipment.

A well-known type of mining machine is adapted to run along and/or be guided by an armoured, flexible scraper chain conveyor extending along the mineral face. Such a machine requires power for two purposes, firstly to haul itself along the mineral face and secondly, to drive mineral cutting means, e.g. cutting heads and/or chains.

For hauling itself along the mineral face, the machine has in the past been provided with an electric motor and associated sprocket(s) for engaging a tensioned haulage chain staked at each end of the mineral face, while the mineral cutting means have been driven usually by electric but sometimes by hydraulic motors. More recently alternative haulage systems obviating the need for a haulage chain have been proposed and that of British Patent Specification No. 1,352,543 is in use in British coal mines, and in the system of British Pat. No. 1,352,543 the machine drives itself from the conveyor.

However, while the above such haulage proposals have obviated the need for the haulage chain, the use of electric motors necessitates electric supply cables extending along the mineral face, which cables are attached to the machine and hence displayed by the machine as the latter hauls itself to and fro along the mineral face, and a common problem is the handling of these necessarily flexible cables, which are usually contained in a pocket or channel extending along the goaf side of the conveyor, the main requirements being firstly to keep the cables off the conveyor and secondly out of the path of the conventional, hydraulically powered, self-advancing mine roof supports extending along the goaf side of the conveyor. Apart from the longwall type of mining machine described above, there are also "shortwall" machines known that are usually crawler mounted on endless tracks, as well as machines for driving tunnels, or mine roadways. Again, all these machines require flexible cables to convey electric power to one or more electric motors of the machines.

Conventional mine locomotives operating for example in coal mines are powered by electrical or diesel means, and while from the practical standpoint these have proved satisfactory and have been in service for many years, their power means creates fume problems and/or flame proofing problems which are particularly dangerous in coal mines with their potentially hazardous atmospheres. In chemical plants and ordnance factories, there is also a requirement for flameproof operation of locomotives e.g. in the transport of petro chemicals.

Thus, whatever particular equipment is involved, relatively long, trailing, electrical supply cables are employed, which inter alia fatigue at their bending points and which inevitably become caught or damaged by the equipment involved.

The object of the present invention is to provide an electrical power conduit that obviates the need for the usual electrical supply cables attached to a machine and that provides a more efficient means of power supply to a machine.

According to the present invention an electrical power supply conduit comprises an elongate electrical conductor located in the conduit, an entry slot extending longitudinally of the conduit through which slot, in use, an electrical pick up means of an electrical machine may enter the conduit to gain access to the electrical conductor, and flexible mechanical sealing means extending longitudinally of the conduit and normally closing the slot.

The invention also includes a conveyor pan provided with a conduit as above defined, and also an armored scraper chain conveyor assembled from a plurality of such pans.

According to another aspect of the present invention, a mineral cutting machine is provided with electrical pick up means movable, in use, with the machine to pick up electrical energy from a stationary conductor.

According to another aspect of the present invention a longwall mining machine is provided with electrical pick up means movable, in use, with the machine along an armored face conveyor to pick up electrical energy from a conductor carried by or forming part of the conveyor.

The pick up means is preferably a pantograph but alternatively could be an induction coil, while an electrical power supply is readily available at an end of a mineral face.

The sealing means is effective to prevent ingress to the conduit of dust, dirt, water, chemicals etc. However, the sealing means is preferably also effective as a gas seal for when operating in a potentially hazardous atmosphere e.g. of a coal mine or chemical works it is of advantage to provide in the conduit a substantially uniform and substantially constant pressure above atmospheric pressure to maintain a safe environment within the conduit. Such pressurization may be effected either with fresh, clean air (i.e. in the case of a coal mine air that does not contain coal dust or methane) or with an inert gas e.g. nitrogen. Thus, in accordance with a first proposal, one end of the conduit is closed completely e.g. by a bolted or welded closure plate, with or without a gasket, while at the other, "filling end", there is provided a similar closure plate that incorporates an attachment means e.g. a hose nipple for entry of a supply of compressed air or inert gas to the interior of the conduit. Alternatively, fresh clean air may simply be coursed (pumped under relatively low pressure) through the conduit, the air being introduced at one end, to exit at the other end, which other end may be left open or closed by a one-way valve e.g. a simple flap, in which case the interior of the conduit is only slightly higher pressure than the exterior. Thus any leaking in the sealing means results in loss of compressed air or inert gas from the conduit rather than ingress of explosive gas mixture e.g. methane and air, so that any of the above proposals achieves the advantage of providing a flameproof source of electrical power for operation in potentially hazardous locations e.g. coal mines, chemical works, explosives factories etc. when the essential requirement is for flameproof operation.

The flexible mechanical sealing means may comprise a pair of elongate resilient members abutting one another along the slot. The resilient members may be thick-walled rubber tubes which may be inflatable. Alternatively the elongate resilient members may be a pair of rubber flaps.

Irrespective of the nature of the electrical machine involved, it is convenient to provide the conduit in unit lengths, firstly to facilitate handling and secondly for the negotiation of curves. Therefore in accordance with a further feature of the invention each end of the electrical conductor is capable of electrical connection to an adjacent end of a conductor of an adjacent similar conduit (or to an electrical power supply) with adjacent ends also being connectable together, and flexible gas sealing joint located at the junction between adjacent conduits.

In the case of a longwall or shortwall mining machine simply by providing an additional compressor in the roadway conventionally used for fresh air supplies, the conduit may be readily pressurized with fresh clean air, and such an air pressure system readily restricts the potentially hazardous entry of water, and mine atmosphere air, usually with a methane content, coal dust, water etc. into the conduit and hence obviates any potential short circuiting, or dangers from sparking, at the conductor. Although air may leak from the conduit, this is of no consequence providing the compressed air supply i.e. a compressor, is of such capacity to replenish such leaks.

For a longwall mining machine the conduit may be attached to support plates located on the goaf side of conveyor pans, the conduit being fabricated to rectangular section. For a shortwall mining machine or a tunnelling machine or a roadway driving machine, the conduit is conveniently attached to the conventional roof supports or to the conventional roadway arches. For a locomotive the conduit is located either at track level (e.g. between or to one side of the rails) or overhead (e.g. by suspension from mine roadway arches).

According to another preferred feature, the pick up means from the electrical machine e.g. the pantograph, is located at the end of a relatively long arm e.g. 10 to 15 ft. which passes through the sealing means to enter the conduit, to ensure that any sparking that takes place at the pantograph is positively contained within the conduit at the zone surrounding the pantograph and cannot escape through the sealing means displaced by the pantograph carrying arm.

Preferably two pantographs are employed such that whenever one pantograph spans a joint between adjacent conductors and hence may be subject to ineffective or intermittant current pick up, the other is not over a joint, so as to ensure satisfactory and constant current pick up.

Preferably the conductor (and several may be provided in the conduit) is of copper and the conduit may be provided with conventional earth leakage systems, and a conductor for auxilliary services e.g. signalling systems, while the pantograph(s) may be of generally conventional configuration with the usual current collector(s).

Preferably for a mining machine, the conveyor pans include a guide rod or rack bar, located at the upper end of the support plate of the type disclosed in British Patent Specification No. 1,352,543, with the pegs displaceable about generally vertical or generally horizontal axes, and the invention is particularly suitable for use in conjunction with an armored flexible conveyor having the control with regard to separation of individual pans and snaking-over as described in British Patent Specification No. 1,378,949.

The invention will now be further described, in greater detail, by way of example, with reference to the accompanying drawings, in which:

FIG. 1 is a perspective view of a mining machine mounted on an armored conveyor having a conduit in accordance with the invention;

FIG. 2 is a section on the line II — II of FIG. 1;

FIG. 3 corresponds to FIG. 2, but is a sectional view through a second embodiment of conduit in accordance with the invention, being generally on the line III — III of FIG. 4;

FIG. 4 is a view generally on the line IV — IV of FIG. 3;

FIG. 5 is a sectional view through a third embodiment of conduit;

FIG. 6 is a sectional view through a fourth embodiment of conduit;

FIG. 7 is a sectional view through a fifth embodiment of conduit; and

FIG. 8 shows diagramatically the application of the conduit of the invention to a mine locomotive.

In all figures like component parts are accorded like reference numerals.

A hollow rectangular conduit 1 fabricated from top, bottom and side plates 2 is bolted (FIGS. 1 to 4) or welded (FIGS. 5 to 7) to a support plate 3 attached to a goaf side sidewall 4 of a conveyor pan 5 having a face side sidewall 6 spaced from sidewall 4 by a deck plate 7. A plurality of pans 5 are connected together, end to end to form an armored conveyor extending along the mineral face (not shown). The conveyor is seated on a mine floor 8, while a mining machine 9 is located on, and guided by the conveyor sidewalls via the conventional shoes. At the upper end of the plate 3 of each pan is supported one or more rack bars 10 housing reciprocable pegs 11 for the mining machine 9 having a haulage arrangement 12 of the form described in British Pat. Specification No. 1,352,543. Towards the lower end of each support plate 3 is secured a clevis rail 13 for attachment to the advancing rams (not shown) of conventional, hydraulically powered, self-advancing mine roof supports.

As shown in FIGS. 2, 3 and 5 to 7, the conduit 1 is provided with an insulated, extruded, synthetic plastics carrying rail 14 for a plurality of elongate copper conductors 15 while the conduit of each pan is also provided with a longitudinally extending entry slot 16 in the top plate 2 closed by a flexible sealing means 17 constituted by a pair of inflated tubes 18, adjacent peripheries thereof abutting one another, each tube 18 being located between top plate 2 and an intermediate plate 19. A pick up means 20 enters the slot 16 and is constituted by two spaced pantographs 21, incorporating suitable brush gear, extending from the machine, which pantographs move with the machine, along the individual pans 5. The pantographs 21 are located at one end of a towing link 22 that extends longitudinally within the conduit 1 and terminates at a double ended, P.T.F.E. coated or chromium plated, entry wedge or divider 23 to part the tubes 18, so that when the sealing means 17 is progressively displaced by the wedge 23, as the machine 9 advances, the pantographs 21 are remote from the displaced sealing means 17 by a distance corresponding to the length of the towing link 22, and as illustrated in FIG. 1 by at least the length of one conveyor pan 5. With the towing link 22 extend the necessary cables 24 conveying power from the conductors 15 to the conventional electric motor of the machine 9.

In accordance with a first proposal of the invention, at one end of the conveyor, the conduit 1 is closed completely, eg. by a bolted or welded closure plate, with or without a gasket, and at the other "filling" end there is provided a similar closure plate that incorporates an attachment means e.g. a hose nipple, for a supply of gas to the interior 25 of the conduit to place the interior at a pressure higher than the exterior 26. In conventional longwall coal mining practice, two roadways are located at each end of the mineral face, and a fresh air supply is available at one roadway, to pass along the mineral face and to be removed via the other roadway. Thus if the intention is to pressurize the conduit 1 with fresh clean air, then it is convenient to have the "filling" end of the conduit adjacent the roadway having the conventional clean air supply. Similarly, a "safe" source of electrical power exists in one roadway, to which the conductors 15 are suitably connected, through a closure plate. As an alternative the conduit 1 can be pressurized with nitrogen, from suitable bottles. In accordance with a second proposal of the invention, the other end of the conduit from the "filling" end can be left open or closed by a one-way valve e.g. a simple flap, with fresh clean air simply coursed through the conduit 1, in which case the interior 25 is only at a slightly higher pressure to the exterior 26. However with any of the above proposals the advantages achieved is the provision of a flameproof source of electrical power for a mining machine. By providing sufficient cross-sectional area of conductors 15, several machines e.g. three, can operate on the same conveyor, while power for the other sources e.g. coal face signalling systems, powering motors for conveyor drives, etc. can be taken from the conduit 1 thereby eliminating the need for conventional electrical cables.

It is necessary to provide at the junction of the the conduit 1 of adjacent pans 5 a flexible gas sealing joint, the flexibility being required firstly to accommodate the conventional "snaking" advance of the individual pans 5, and secondly to accommodate the inevitable unevenness of the floor 8. Such connection may be via "U"0 shaped molded rubber sealing gaskets extending both underneath the conduit and up to the vicinity of the tubes 18, the latter of course sealing the top of the conduit. The gaskets have generally "T"-shaped cross-sectional shape, one such gasket 27 being shown in FIG. 4. The gasket 27 is secured across plates 2 of adjacent conduits 1 by bolted clamp plates 28 with the leg 29 of the "T" insert between adjacent ends of the conduits. It is similarly necessary to supply a flexible joint at the rails 14 and conductors 15 of adjacent pans 5. As the pantographs 21 are spaced longitudinally from one another, should one pantograph suffer a current interruption when crossing a joint between conductors 15 of adjacent conduits, the other pantograph is not on a joint and hence is able to maintain a constant current supply to the electric motor. A flexible dirt sealing strip 30 is secured along one of its edges to the conduit 1 over the gap 16 and is similarly displaceable by the wedge 23 as the machine advances.

In the embodiment of FIGS. 3 and 4, the top and intermediate plate are provided by the flanges of angle irons 31, while one current collecting brush 32 of one pantograph 21 is shown urged into contact with its conductor 14 by a leaf spring 33. As illustrated in FIG. 4, the two pantographs 21 are connected by a link 34 and a 3-phase current supply to the electric motor is converted by leads 35, 36 and 37 for while there is also provided a pilot lead 38 and an earth lead 39.

In the embodiment of FIG. 5, the sealing means 17 is constituted by two rubber flaps 40 bolted to bottom plate 2 at which plate there is provided the slot 16.

In the embodiment of FIG. 6, the slot 16 is again provided along the bottom plate 2 of the conduit 1.

In the embodiment of FIG. 7, the sealing means 17 is constituted by two thick walled tubes 41, and again the slot 16 is in the bottom plate 2.

As indicated in FIG. 8, the conduit 1 of any previous embodiment may be for the supply of power to the electric motor(s) of a locomotive 9A, the conduit may simply be located at groud level, alongside rails 42, as indicated at 1A, or between the rails 42 as indicated at 1B or alternatively, the conduit can be provided overhead by being suspended from mine arches 43 of a mine roadway 44 as indicated at 1C. In such cases the pantograph(s) are simply located respectively at one end of towing links or arms 22A, 22B, 22C, extending from the locomotive into the conduit, and all provided as before with wedges for sealingly parting the flexible sealing means of the conduit.

The internal pressure of conduit 1 is substantially uniform throughout the conduit and substantially constant. Preferably, the pressure in the conduit, and in the sealing means 17 of an inflated type, is continuously monitored, as part of a control system for whatever electrical machine(s) is involved, and it can readily be arranged for the machine to be automatically halted, by current switch-off, should any sudden drop in pressure occur.

What I claim is:

1. An apparatus for supplying electrical power in a potentially explosive atmosphere to a mining machine having an electrical pick-up means for receiving electrical power, comprising:
   an elongate conduit means;
   an elongate, electrical conductor located in said conduit means;
   said conduit means having a longitudinal slot formed therein to provide access to said conductor by the mining machine pick-up means;
   flexible sealing means extending longitudinally of said conduit means and normally enclosing said slot; and
   means for creating a substantially uniform, substantially constant internal pressure throughout said conduit means, said internal pressure being greater than the air pressure outside said conduit means to prevent ingress of air into said conduit means through said seal means.

2. A conduit as claimed in claim 1, pressurized with fresh, clean air.

3. A conduit as claimed in claim 1, pressurized with an inert gas.

4. A conduit as claimed in claim 3, pressurized with nitrogen.

5. A conduit as claimed in claim 1, wherein a closure plate closes one end of said conduit while a similar closure plate is provided at the other, "filling" end of said conduit, an attachment being incorporated in said similar closure plate for entry of a supply of compressed air or inert gas to said conduit.

6. A conduit as claimed in claim 1, wherein fresh clean air is coursed through said conduit, said air being introduced at one end of said conduit and the other end being open or closed by a one-way valve.

7. A conduit as claimed in claim 1, wherein said sealing means comprises tubes.

8. A conduit as claimed in claim 7, wherein said tubes are inflatable.

9. A conduit as claimed in claim 7, wherein said tubes are solid.

10. A conduit as claimed in claim 7, wherein each tube is constrained in a channel defined by a top or bottom plate, a side plate and an intermediate plate.

11. A conduit as claimed in claim 1, wherein said sealing means is a pair of flaps.

12. A conduit as claimed in claim 1, wherein said entry slot is provided along a top of said conduit.

13. a conduit as claimed in claim 1, wherein said entry slot is provided along a bottom of said conduit 14. A conduit as claimed in claim 1, wherein a plurality of conductors are carried by a rail of synthetic plastics insulating material.

15. A conveyor pan provided with a conduit as defined in claim 1.

16. An armored scraper chain conveyor assembled from a plurality of pans as defined in claim 15.

17. An armored scraper chain conveyor as claimed in claim 16, wherein a flexible gas tight joint is provided at the junction between adjacent conduits.

18. A rail track provided with a conduit as defined in claim 1.

* * * * *